US010768789B1

(12) United States Patent
Devadoss et al.

(10) Patent No.: US 10,768,789 B1
(45) Date of Patent: Sep. 8, 2020

(54) DYNAMIC RENDERING OF INTERACTIVE USER EXPERIENCE CARDS

(71) Applicant: Amazon Technologies, Inc., Seattle, WA (US)

(72) Inventors: Arunkumar Devadoss, Santa Clara, CA (US); Rajnish Kumar, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 15/961,612

(22) Filed: Apr. 24, 2018

(51) Int. Cl.
*G06F 3/0482* (2013.01)
*G06F 3/0485* (2013.01)

(52) U.S. Cl.
CPC .......... *G06F 3/0482* (2013.01); *G06F 3/0485* (2013.01)

(58) Field of Classification Search
CPC .............................. G06F 3/0482; G06F 3/0485
USPC ................ 715/783, 833, 784, 792, 810, 828
See application file for complete search history.

(56) References Cited

U.S. PATENT DOCUMENTS

| 7,055,104 B1 * | 5/2006 | Billmaier .............. G06F 3/0481 348/E5.104 |
| 9,753,630 B1 * | 9/2017 | Kim ...................... G06F 3/0485 |

\* cited by examiner

*Primary Examiner* — Andrey Belousov
(74) *Attorney, Agent, or Firm* — Kilpatrick Townsend & Stockton LLP

(57) ABSTRACT

Described herein are approaches for presented interactive user experience cards within an application menu of an application. Dynamic content of the cards can be downloaded from an external server and presented in response to user inputs. The dynamic content can be updated dynamically and served when appropriate.

20 Claims, 11 Drawing Sheets

DYNAMIC RENDERING OF INTERACTIVE USER EXPERIENCE CARDS

BACKGROUND

A computer application may include an application menu for navigating within the application. Depending on the type application, the application menu may include a list of options customized to the subject matter of the application. For example, a gaming application may include a list of options for checking rules, inviting others to play, adding new features, and the like. This list of options can be presented as a list of selectable elements (e.g., strings of text, graphical icons, etc.) that, when selected, navigate to a different portion the application.

Some application menus may include options to view content other than the list of options. This other content may be updated periodically (e.g., in connection with an application update cycle).

BRIEF DESCRIPTION OF THE DRAWINGS

Various examples in accordance with the present disclosure will be described with reference to the drawings, in which.

DETAILED DESCRIPTION

Figure 1:
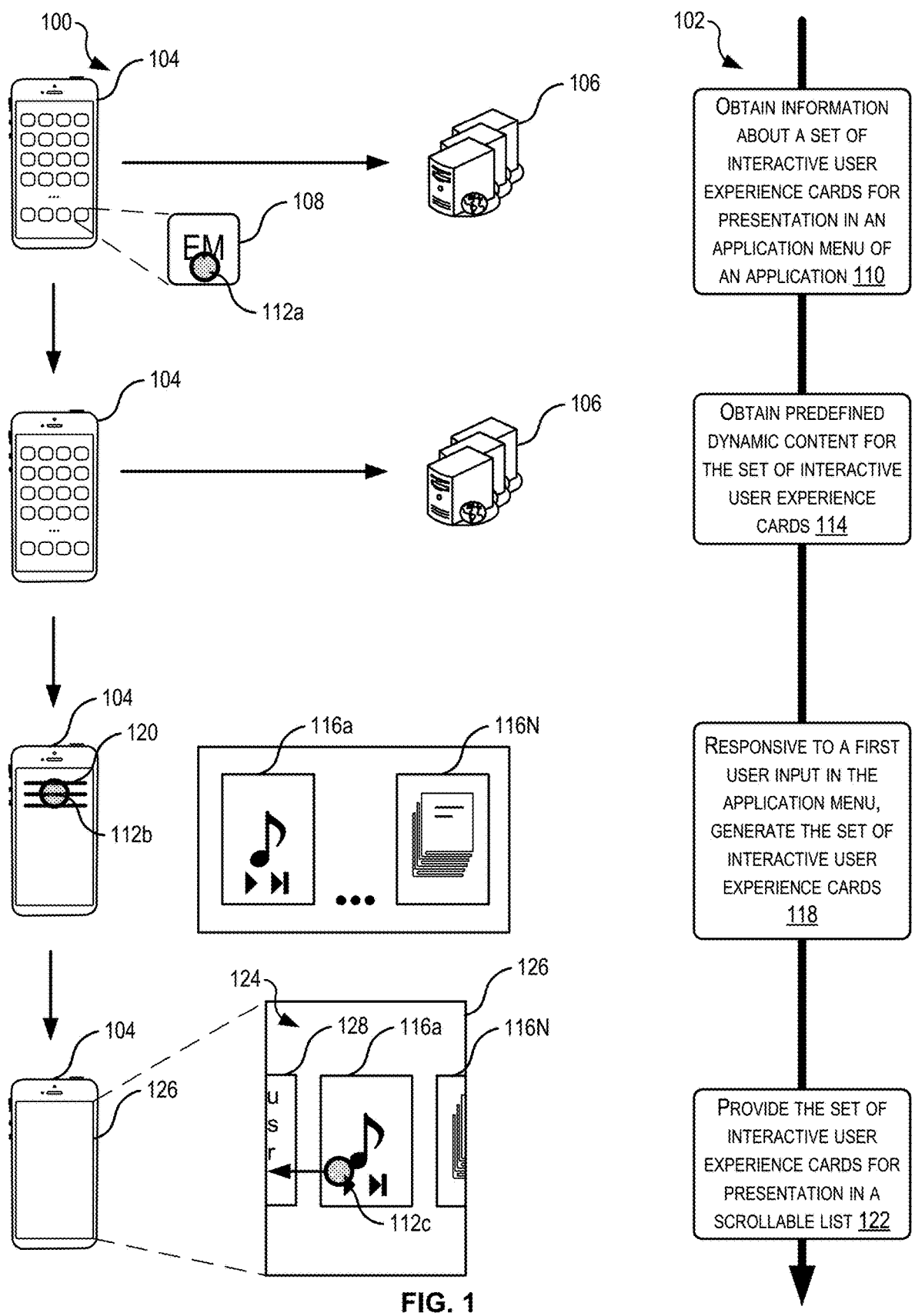
FIG. 1 is an example block diagram and associated flowchart showing a process for implementing techniques relating to dynamically rendering interactive user experience cards, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to, among other things, techniques and systems for dynamically rendering interactive user experience cards within a computer application. In particular, the interactive user experience cards can be dynamically-rendered in connection with an application menu within the computer application. The number and substance of the interactive user experience cards can be adapted in each session that the computer application is accessed. The interactive user experience cards can be used to initiate different user experiences that are facilitated within the application, outside the application, and/or provided in some other manner. For example, selecting a link in a first user experience card may load a different page in the computer application (e.g., navigate to a page including a list of interesting items for procurement within an electronic marketplace application). Selecting a link in a second user experience card may launch an instance of a different computer application without actually switching from the computer application to the different computer applications (e.g., launch the functionality of a music streaming application from a user experience card presented within an electronic marketplace application). Selecting a link in a third user experience card may load a webpage in web browser that is separate from the computer application. Dynamic content of the user experience cards can be pre-defined by content curators. The content curators may indicate what elements are included in the user experience cards, how they are arranged within boundaries of the user experience cards, and what function and/or experiences occur when a card is accessed by a user.

Turning now to a particular example, a system is provided that includes a user device and a service provider. The service provider may be configured to at least host an application that is executed on the user device. When a user first opens the application (e.g., by selecting the application using an input device), a request for information about a set of interactive user experience cards can be sent to the service provider. In response, the service provider may send information that identifies the number of interactive user experience cards that are available and location information from where dynamic content for the interactive user experience cards can be downloaded (e.g., from a content delivery network associated with the service provider). When the user first opens an application menu in the application, the application menu can be presented in a primary position on a display of the user device. At this same time, dynamic content of a first interactive user experience card can be downloaded and a portion of the dynamic content can be rendered in a slot adjacent to the application menu (e.g., a secondary position on the display). For example, an edge of a colored container that will hold the first interactive user experience card can be rendered in the slot. To move the first interactive user experience card to the primary position, the user may scroll (e.g., a swipe from side to side) such that the application menu moves from the primary position to a different secondary position. At this time, dynamic content of a second interactive user experience card is downloaded and a portion of the dynamic content is rendered in a slot adjacent to the first interactive user experience cards (e.g., in the same secondary position previously occupied by the first interactive user experience card). In this example, two secondary positions are presented on opposite sides of the primary position which is occupied by the first interactive user experience card. Selection of the first user experience card (e.g., selection of an embedded link) will cause an interactive user experience, which may take place within the application and/or outside the application. The link can include code that is executed by the user device to provide the interactive user experience.

The techniques described herein improve the functioning of computer systems that provide interactive user experience cards. In particular, because general feature information about the interactive user experience cards and the actual content for interactive user experience cards are obtained separately, bandwidth, processing, and battery savings at a user device can be realized because content of the interactive user experience cards may only be downloaded when requested (e.g., in response to a user input). Additionally, use of such on-demand and dynamic downloading of the content of the interactive user experience cards may mean that application updates are smaller in size, thereby reducing bandwidth demands and processing for applying the updates.

Additionally, as described in some examples, use of the interactive user experience cards in combination with the application menu improves efficiency of using the user device and improves an overall user viewing experience. Such efficiency comes from the fact that the user does not need to leave the application menu in order to view and access interesting content. Additionally, when the interesting content causes launching of functionality of a different application, additional efficiencies are realized because the user is not required to close the application and reopen the different application. Instead, the user simply selects a link on the interactive user experience card and the functionality of the different application is accessible. Thus, the user can more efficiently access the content that she really wants with fewer clicks, prompts, and/or screens, as compared to conventional approaches.

Turning now the figures, FIG. 1 is an example block diagram 100 and associated flowchart showing a process 102 for implementing techniques relating to dynamically rendering interactive user experience cards 116, according to at least one example. The diagram 100 depicts a user device 104 and a service provider 106 that interact to perform the process 102. In some examples, the process 102 can be performed by a dynamic rendering component, which may be implemented by the user device 104 and/or by the service provider 106.

The user device 104 can be any suitable device configured to run one or more computer applications, which may be web applications, mobile applications, desktop applications, and any other suitable type of application. For example, the user device 104 may include an application 108. The application 108, as described herein, is an example of an electronic marketplace application, and may include a dynamic rendering component. It should be understood, however, that the techniques described herein may be implemented within any suitable application (e.g., other than electronic marketplace applications).

The service provider 106 can be any suitable server component capable of interacting with the user device 104 in a client/server relationship. For example, the server 106 may be a computer server, server cluster, distributed virtual server (e.g., cloud-based server), or any other combination of computing resources (e.g., processing, storage, networking, etc.) suitable for supporting techniques described herein relating to dynamic rendering of interactive user experience cards.

The process 102 may begin at 110 by obtaining information about a set of interactive user experience cards 116 for presentation in an application menu of an application (e.g., the application 108). In some examples, this may be performed by the user device 104 responsive to a user input 112a that selects the application 108. For example, when the application 108 is first opened, the user device 104 may make a call to the service provider 106 requesting information about the set of interactive user experience cards 116. In this manner, the user device essentially checks for new and/or updated cards to ensure that the set of interactive user experience cards 116 remain updated and relevant to a user of the user device 104.

At 114, the process 102 may include obtaining predefined dynamic content for the set of interactive user experience cards 116. In some examples, this may be performed by the user device 104 responsive to the user input 112a and/or without a user input. For example, after the user device receives the information about the set of interactive user experience cards 116 at 114, the device may use the information to determine how to obtain the predefined dynamic content at 114. The predefined dynamic content may be hosted by the service provider 106, by a content delivery network (CDN) associated with the service provider 106, or at any other suitable network location accessible by the user device 104. In this manner, obtaining the predefined dynamic content may include requesting the predefined dynamic content from the element that hosts the predefined dynamic content. In some examples, the predefined dynamic content is downloaded to the user device 104 as a complete bundle and/or separately (e.g., individual packages for reach card 116).

At 118, the process 102 may include, responsive to a first user input 112b in the application menu, generate the set of interactive user experience cards 116a-116N. This may be performed by the user device 104. In some examples, generating the set of interactive user experience cards 116 may be based at least in based at least in part on the information and the predefined dynamic content obtained respectively at 110 and 114. In some examples, the information and the predefined dynamic content may be obtained in response to a single request. The information may indicate a number of the cards 116 and the predefined dynamic content may uniquely map to the number of cards 116.

The user input 112b may select an application menu element 120 of the application menu of the application 108. For example, the application menu element 120 may be a tri-bar icon in the application 108 that opens the application menu.

In some examples, the set of interactive user experience cards 116 may be generated all at once and rendered at an appropriate time. In some examples, individual ones of the user experience cards 116 are generated and rendered one after another (e.g., as a user scrolls through the interactive user experience cards 116). In any event, generating the set of interactive user experience cards 116 may be performed responsive to some user input and/or loaded in the background.

At 122, the process 102 may include providing the set of interactive user experience cards 116 for presentation in a scrollable list 124 at a display device 126 of the user device 104. In some examples, prior to providing the scrollable list 124, an application menu 128 is provided for presentation at the display device 126. For example, after the user input 112*b* selects the application menu element 120, the application menu 126 may be provided. In some examples, the application menu 128 is presented in the same form as the set of interactive user experience cards 116 (e.g., as a scrollable card). From this view with the application menu 128 prominently displayed on the display device 126, a user input 112*c* may be used to reveal a first interactive user experience card 116*a*, as shown in FIG. 1. The user input 112*c* may be a side-to-side swipe.

In some examples, the scrollable list 124 may provide a partial view of a next interactive user experience card 116N when the first interactive user experience card 116*a* is prominently displayed on the display device 126. The partial view may be sufficiently detailed to pique one's interest (e.g., show a minimal portion of the card). In some examples, only a portion of the next interactive user experience card 116N is rendered in the view illustrated in FIG. 1. For example, a background color of the interactive user experience card 116N may be rendered, with remaining portions being rendered responsive to the user input 112*c*.

In some examples, particular elements of the interactive user experience cards 116 may be selectable to perform some predefined function. For example, the interactive user experience card 116*a* may correspond to new music album. Selection of a button or link in the interactive user experience card 116*a* may launch an interactive user experience that includes playing of the music using a music application that is installed on the user device 104. This may be done without switching to the music application. Instead, the interactive user experience can be experienced by a user within the application menu of the application 108.

Figure 2:
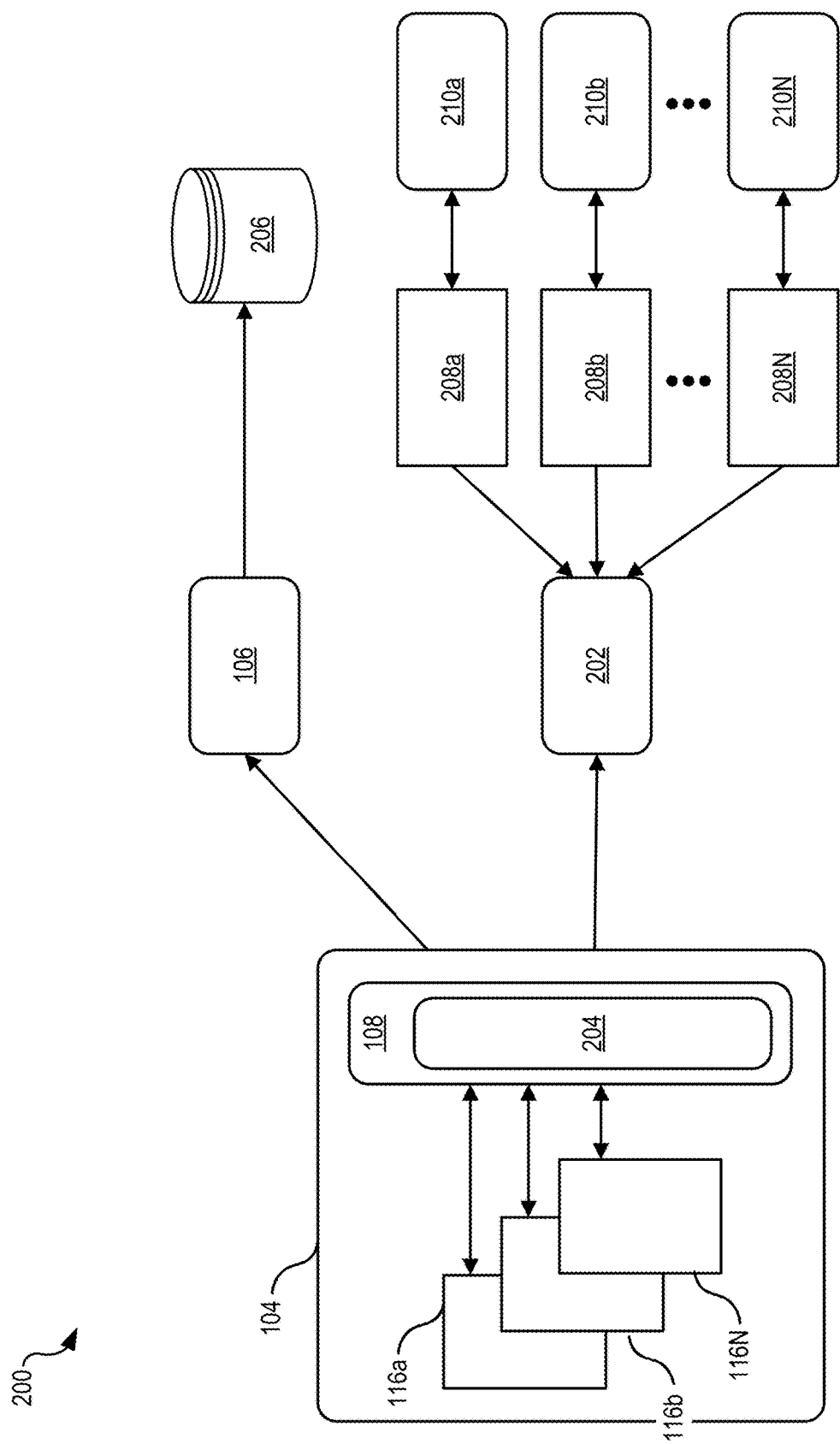
FIG. 2 is an example schematic architecture for implementing techniques relating to dynamically rendering interactive user experience cards, according to at least one example.

FIG. 2 is an example schematic architecture or system 200 for implementing techniques relating to dynamically rendering interactive user experience cards, according to at least one example. The system 200 may include the user device 104, the service provider 106, and a content delivery network (CDN) 202. In some examples, the service provider 106 and the CDN 202 may be considered the backend/server side of the system 200 and the user device 104 may be considered the frontend/client side of the system 200. The backend may be operated by the same entity or by separate entities. For example, the service provider 106 may host one or more applications 108 running on the user device 104 and the CDN 202 may be used to deliver certain dynamic content to the user device 104 in response to communications from the applications 108. The user device 104, the service provider 106, and the CDN 202 may communicate via one or more networks, which may include the Internet, cellular networks, cable networks, fiber networks, and other public and/or private network.

The user device 104 may be any suitable type of computing device such as, but not limited to, a wearable device, a tablet, a mobile phone, a smart phone, a network-enabled streaming device (a high-definition multimedia interface (HDMI) microconsole pluggable device), a personal digital assistant (PDA), a laptop computer, a desktop computer, a thin-client device, a tablet computer, a high-definition television, a web-enabled high-definition television, a set-top box, etc. For example, as illustrated in FIG. 1, the user device 104 may be a portable smartphone device. The user device 104 may include memory and processor(s) to implement the techniques described herein. The processors may be implemented as appropriate in hardware, computer-executable instructions, software, firmware, or combinations thereof. Computer-executable instruction, software, or firmware implementations of the processor may include computer-executable or machine-executable instructions written in any suitable programming language to perform the various functions described. The memory may be any suitable form (e.g., random access memory (RAM), read-only memory (ROM), flash memory, etc.).

The user device 104 may include one or more applications 108. As illustrated, the user device 108 may include an application 108 that includes a dynamic rendering component 204. The dynamic rendering component 204 may allow the user device 104 to perform the techniques described herein (e.g., rendering the interactive user experience cards 116 at the user device 104). In some examples, the dynamic rendering component 204 may be added to any suitable computer application to enable the functionality described herein. In some examples, the functions of the dynamic rendering component 204 may be implemented by the service provider 106, and/or may be distributed between the user device 104 and the service provider 106.

The dynamic rendering component 204 may be configured to communicate with the service provider 106 and the CDN 202. The dynamic rendering component 204 may also be configured to control instances used to present the interactive user experience cards 116. For example, the instances may be produced using the React Native framework.

The service provider 106 may include at least one memory and one or more processors. The processor may be implemented as appropriate in hardware, computer-executable instructions, software, firmware, or combinations thereof. Computer-executable instruction, software, or firmware implementations of the processor may include computer-executable or machine-executable instructions written in any suitable programming language to perform the various functions described. The memory may include more than one memory and may be distributed throughout the service provider 106. The memory may be any suitable form (e.g., RAM, ROM, flash memory, etc.).

The service provider 106 may include a datastore that includes one or more databases 206. For example, the database 206 may be used to store information associated with the set of interactive user experience cards 116. For example, the information may include a number of card containers, unique card identifiers (e.g., identifiers that identify feature packages useable to render the cards 116), and information about where dynamic content for the cards can be obtained (e.g., links to the CDN 202). The service provider 106 may provide the information from the database 206 in response to the request form the user device 104.

The service provider 106 may also be configured to receive user engagement metrics associated with the interactive user experience cards 116. For example, clicks and impressions can be collected by the dynamic rendering component 204 and shared with the service provider 106 and/or other computer system.

The CDN 202 may be used to store and delivery dynamic content used to generate the interactive user experience cards 116. For example, the CDN 202 may store a plurality of feature packages 208*a*-208N. The feature packages 208 may include the dynamic content that is used by the dynamic rendering component 204 to generate and render the interactive user experience cards 116. In some examples, the feature packages 208 are delivered as JavaScript components.

The feature packages 208 can be designed by one or more different designers, curators, entities, and the like. For example, a feature package 208 can be designed by a partner entity that desires to share their content with a user of the user device 104. As the feature package 208 may define the look and feel of a rendered interactive user experience card 116, the partner entity may design within some set of fixed rules. For example, the size of the containers that hold the interactive user experience cards 116 may be fixed, color pallets may be limited, and links to external computing systems may be limited. In any event, the feature packages 208 may be used to define the user experiences that will occur within the interactive user experience cards 116.

The feature packages 208 may be bundled by one or more bundler entities 210a-210N. In some examples, all of the feature packages 208 may be bundled by a single bundler entity 210. In any event, the bundler entities 210 may be configured to bundle the feature packages 208 in a manner that enables efficient downloading by the user device 104.

In some examples, the dynamic rendering component 204 causes each interactive user experience card 116 to be loaded within its own viewing module. Thus, the correspondence of feature packages 208 to viewing modules may be one to one. In other examples, the dynamic rendering component 204 causes each interactive user experience card 116 to be loaded using a single viewing module. Thus, the correspondence of feature packages 208 to viewing modules may be many to one. In this latter example, the downloaded feature package 208 may be used to make asynchronous calls to the service provider 106 and/or the CDN 202 to load the dynamic content of the interactive user experience cards 116. The viewing module may be set to include any suitable number of interactive user experience cards 116, which may be loaded when appropriate.

Figure 3:
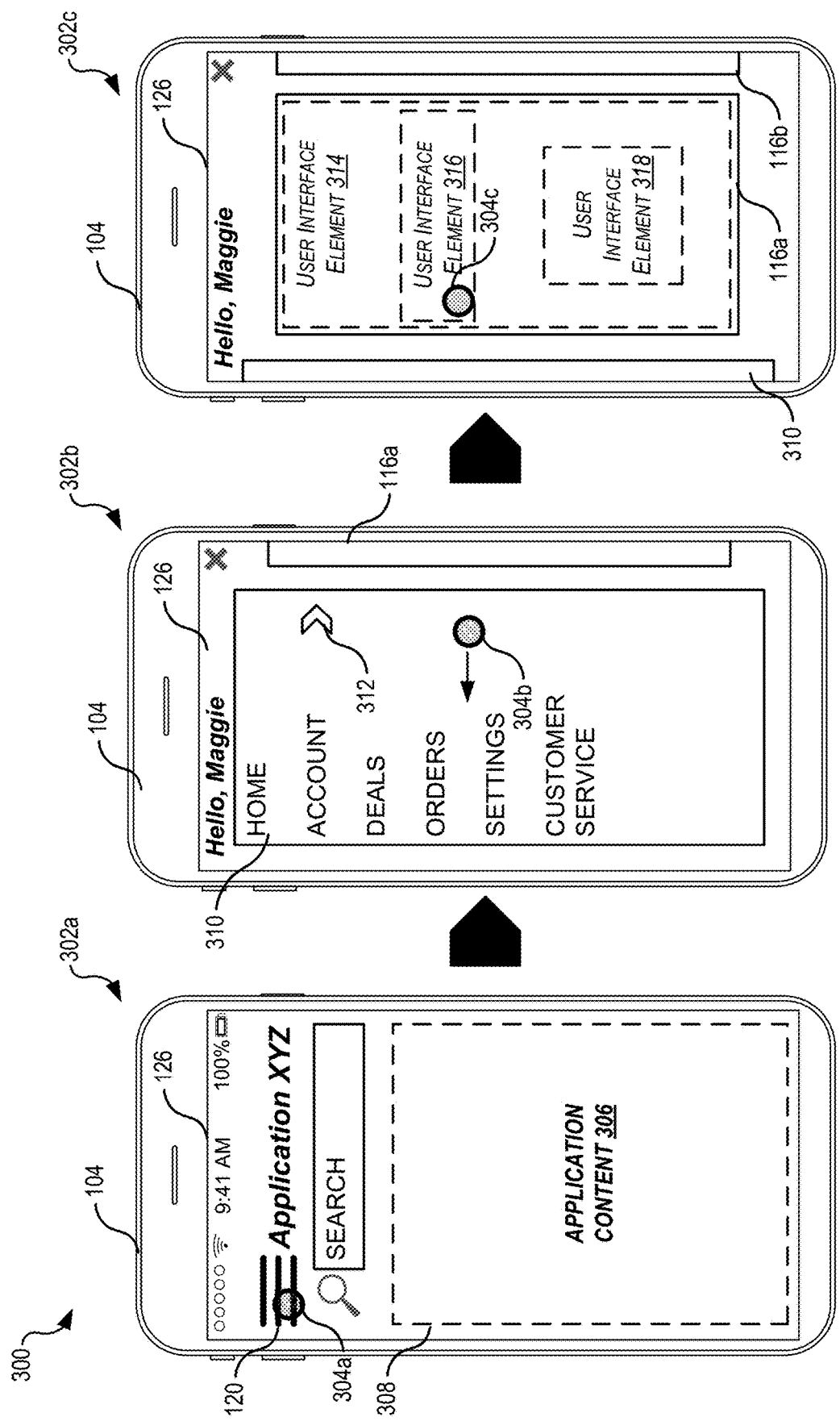
FIG. 3 is an example diagram illustrating an example approach for accessing a dynamically-rendered interactive user experience card, according to at least one example.

FIG. 3 is an example diagram 300 illustrating an example approach for accessing a dynamically-rendered interactive user experience card, according to at least one example. The diagram 300 illustrates the user device 104, with the display device 126 at three different view states 302a-302c. That changes between the states 302 are caused, at least in part, by user inputs, labeled as 304a and 304b. As the techniques described herein may be personalized to users, a user—"Maggie"—may be logged into the application.

Beginning with the view state 302a, the display device 126 displays a home screen of an application (e.g., "Application XYZ"). The home screen includes application content 306 within a content boundary 308, and the application menu element 120 (or other suitable icon that is selectable to access an application menu 310). The application content 306 may include any suitable content that is related to the application. For example, if the application were an electronic marketplace application, the home screen may include particular items offered for procurement, list of recently-viewed items, and other content relating to the application. The user input 304a may select the application menu element 120 so as to cause the user device 104 to present the view state 302b.

Figure 4:
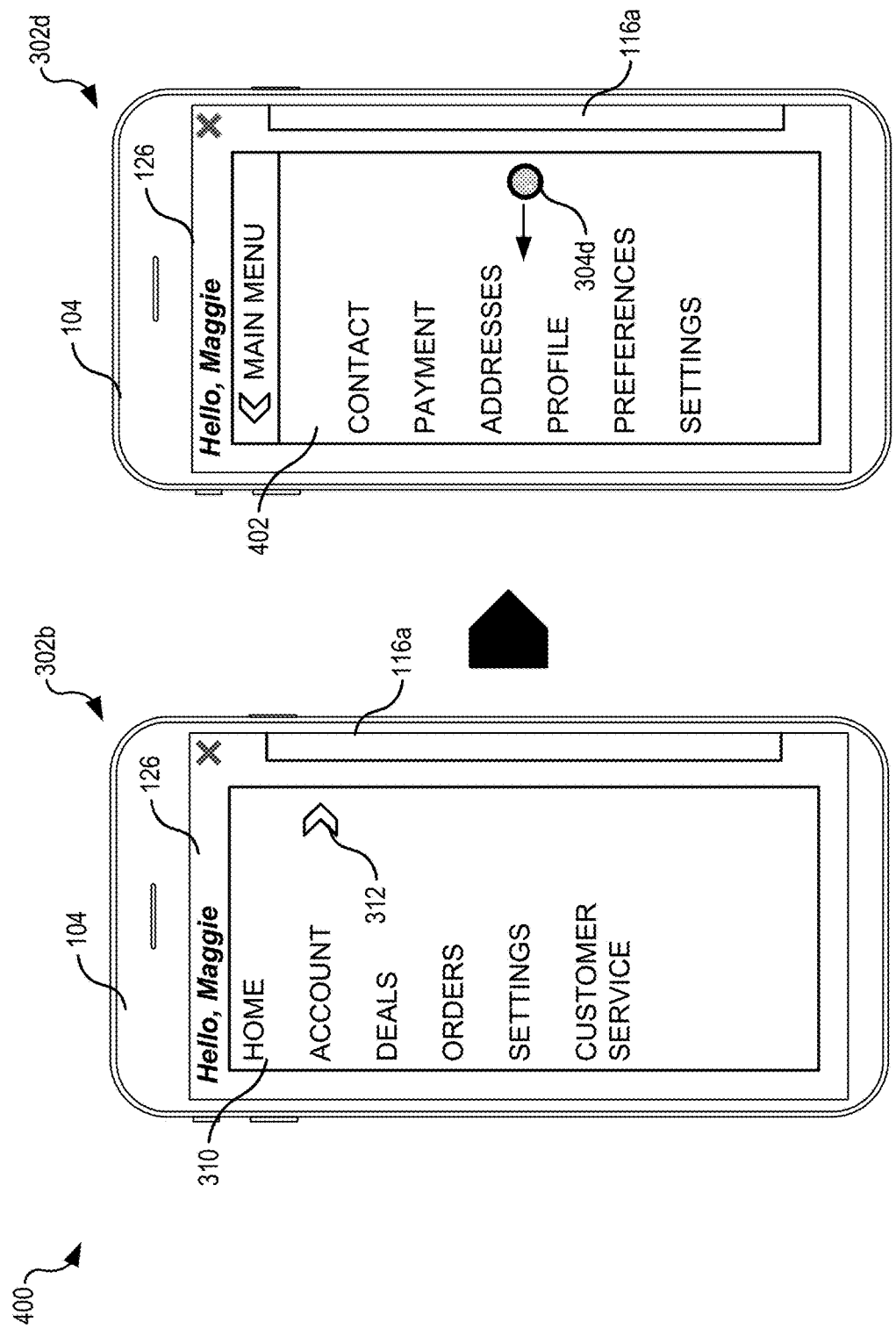
FIG. 4 is an example diagram illustrating an example approach for presenting a sub-menu of an application as an interactive user experience card, according to at least one example.

The view state 302b may include the application menu 310, which represents a menu for accessing features of the application. For example, the application menu 310 may include a list of linkable text that allows navigation to different pages within the application or to perform different functions relating to the application, which may occur outside the application (e.g., place a phone call to customer service). The application menu 310 may also include an indicator 312. The indicator 312 may indicate that a sub-menu of the "ACCOUNT" menu item is available for viewing. FIG. 4 illustrates an example in which the account sub-menu is presented in a card-style format like the interactive user experience cards 116.

In the view state 302b, the application menu 310 is presented in a primary position (e.g., front and center in the application) and an edge portion of a first interactive user experience card 116a is presented in a secondary position, which may correspond to a first container (e.g., a first card slot). In some examples, showing just the edge portion of the first interactive user experience card 116a may be suitable to pique a user's attention sufficiently to prompt the user to perform the user input 304b to swipe to the left. This swiping action may cause the view state 302b to transition to the view state 302c (e.g., scroll across the display device 106).

In the view state 302c, the first interactive user experience card 116a is presented in the primary position in the first container, the application menu is presented in a secondary position to the left of the first interactive user experience card 116a, and a second interactive user experience card 116b is presented in a secondary position in a second container (e.g., second card slot) to the right of the first interactive user experience card 116a. In this arrangement, the user intuitively understands that accessing the menu application 310 may require a right swipe and accessing the second interactive user experience card 116b may require a left swipe. This may be considered a nested scroll arrangement.

The first interactive user experience card 116a may include user interface elements 314-318. The user interface elements 314-318 may be arranged in any suitable manner so as to add variety to the first interactive user experience card 116a. More or fewer user interface elements may be provided in the same or different arrangements in other interactive user experience cards 116. In some examples, the user interface elements 314-318 may be selectively rendered as part of loading the interactive user experience card 116a. For example, the user interface element 314, which may be a background color, may be loaded first and may be visible in the view state 302b. In response to the user input 304b, the remaining user interface elements 316 and 318 may be loaded such that in the view state 302c, all user interface elements will be loaded.

The user interface elements 314-318 may include any suitable icon, link, text, image, feed, etc. In some examples, the user interface elements 314-318 may include software modules that cause certain predefined functions to occur that constitute instant experiences. The predefined functions may include linking to external sources and/or be executable within the application. These predefined functions can include, for example, playing media content (e.g., audio or video file), initiating a stream of media content (e.g., audio or video file), downloading files, executing files within the application, "liking" content of the card, voting on content of the card, sharing content of the card with others, commenting on content of the card, opening a webpage within a browser application, opening a page within the application, launching a different application, and performing any other suitable function. In some examples, user input 304c at the user interface element 316 may launch certain functionality associated with the user interface element 316.

In some examples, once the interactive user experience card 116a moves into the primary position, as illustrated in the view state 302c, one or more predefined functions may automatically execute. For example, as the user input 304b moves the user experience card 116a to the primary position, a music player embedded in the interactive user experience card 116a may begin to play a playlist of songs (e.g., top songs). In this example, the scrolling of the interactive user experience card 116a triggered the functionality of the music player. Thus, providing the instant experiences (e.g., interactions with the interactive user experience cards 116) described herein may occur automatically, e.g., without a user explicitly selecting a user interface element of the interactive user experience card 116.

The arrangement, style, type of function, etc. of the user interface elements 314-318 may be configured by the entity that builds the feature packages 208. For example, the user interface elements 314-318 may include widgets, comment boxes, frames, images, icons, text, links, buttons, any other suitable web-based element.

FIG. 4 is an example diagram 400 illustrating an example approach for presenting a sub-menu 402 of an application as an interactive user experience card, according to at least one example. As introduced with reference to FIG. 3, in the view state 302b, selection of the indicator 312 may enable presentation of the sub-menu 402, as illustrated as view state 302d. In the view state 302d, the sub-menu 402 is presented in a card-style format. In this example, user input 304d (e.g., a swiping input) may cause the sub-menu 402 currently in the primary position to move to a secondary position and cause the first interactive user experience card 116a to move to the primary position, as discussed with reference to FIG. 3.

Figure 5:
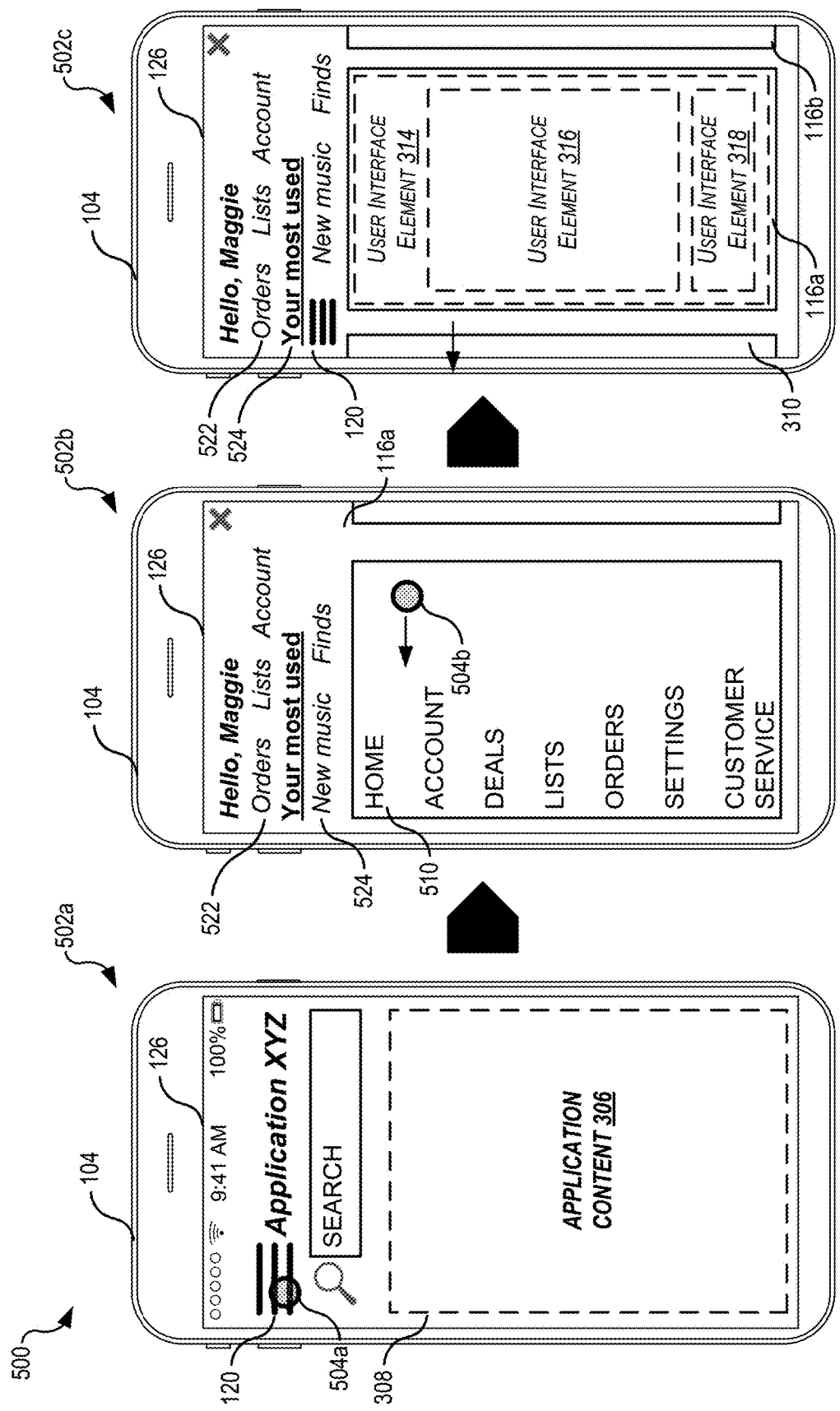
FIG. 5 is an example diagram illustrating an example approach for accessing a dynamically-rendered interactive user experience card, according to at least one example.

FIG. 5 is an example diagram 500 illustrating an example approach for accessing a dynamically-rendered interactive user experience card, according to at least one example. The diagram 300 illustrates the user device 104, with the display device 126 at three different view states 502a-502c. Changes between the states 502 are caused, at least in part, by user inputs labeled as 504a and 504b. As the techniques described herein may be personalized to users, a user—"Maggie"—may be logged into the application.

The view state 502a and manner of interacting may be similar to the view state 302a. Thus, the user input 502a may cause the second view state 502b to be presented. The second view state 502b also shares some similarities with the view state 302b. For example, the second view state 502b includes a menu 510 like the menu 310, but also includes a sub-menu 522 and a commonly-used list 524. The sub-menu 522 may include a few of the top used menu items from the menu 510. The determination of which items to include in the sub-menu 522 may be based on historical use information for a large population of users of the application. The commonly-used list 524 may include links to items other than menu items. For example, the commonly-used list 524 may include links to features of the application that are commonly accessed by the user Maggie. Thus, this list 524 may change from user to user.

The view state 502c may be presented in response to the user input 504b (e.g., a swiping input). The view state 502c may be similar to the view state 302c, except that the sub-menu 522 and the commonly-used list 524 remain in the view state 502c. In other words, the sub-menu 522 and the commonly-used list 524 can remain fixed in the view states 502c and beyond as the interactive user experience cards 116 are scrolled below. This may be desirable to provide an efficient point of access for the a portion of the menu and the dynamic content of the interactive user experience cards 116. In the view state 502c may also be presented the application menu element 120 for returning to the view state 502a.

FIGS. 6, 7, 8, 9, and 1000 illustrate example flow diagrams showing respective processes 600, 700, 800, 900, and 1000, as described herein. These processes 600, 700, 800, 900, and 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 6:
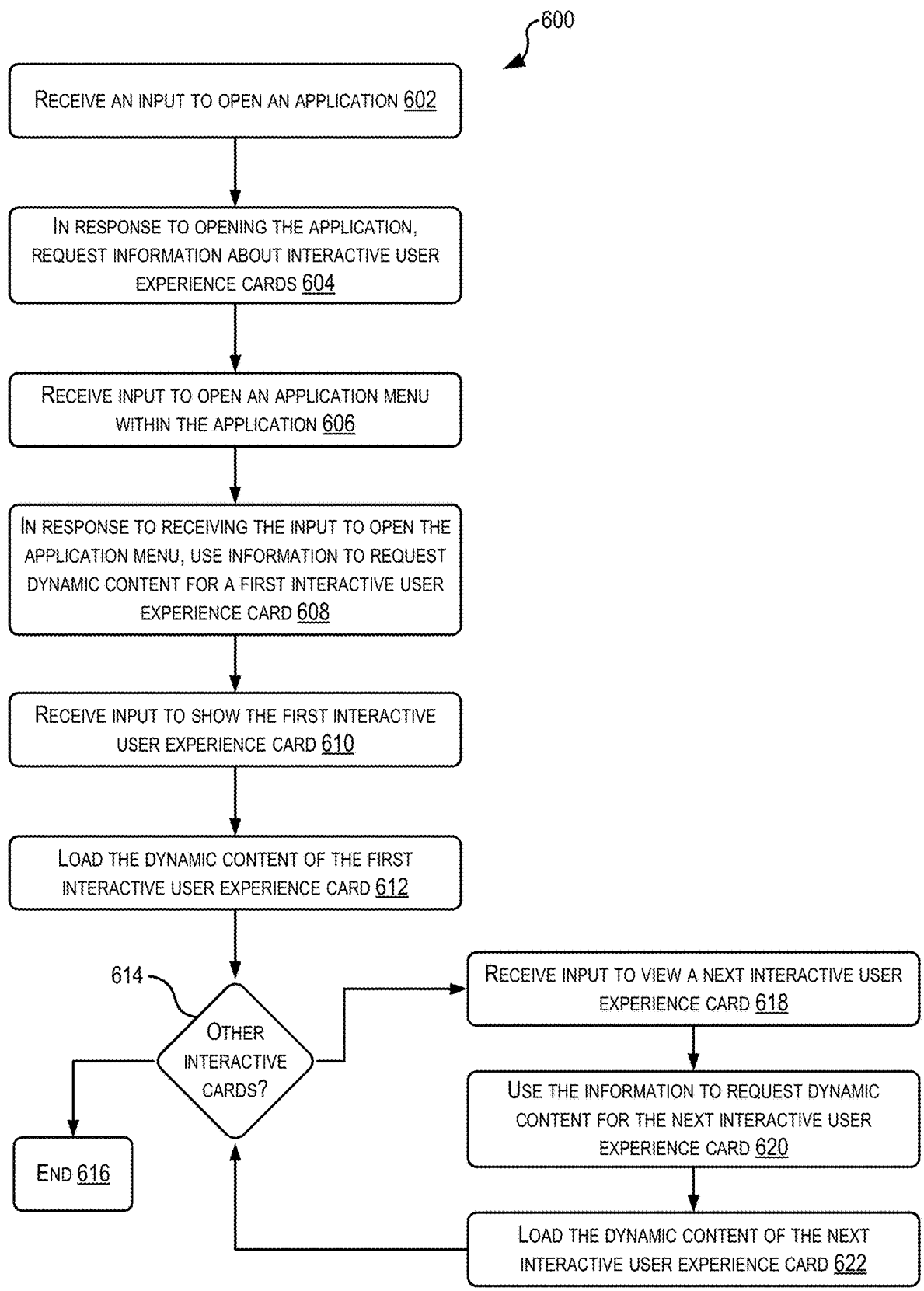
FIG. 6 is an example flow diagram depicting example acts for implementing techniques relating to dynamically rendering interactive user experience cards, according to at least one example.

FIG. 6 is flow diagram of process 600 depicting example acts for implementing techniques relating to dynamically rendering interactive user experience cards, according to at least one example. The user device 104 (FIG. 1) may perform the process 600 of FIG. 6 using the dynamic rendering component 204 (FIG. 2).

The process 600 may begin at 602 by receiving an input to open an application. The input may be received via an input device such as a mouse, touchscreen, keyboard, augmented or virtual reality interface, or in any other suitable manner. The input may cause a user device to launch the application.

At 604, the process 600 may include, in response to opening the application, requesting information about interactive user experience cards. In this manner, unlike conventional approaches that populate dynamic content of cards as part of an application update cycle, the dynamic content of the interactive user experience cards can be current, personalized, and otherwise updated. Requesting the information may include sending any suitable request to a web service such as one hosted by the service provider 106 to provide information about the interactive user experience cards.

At 606, the process 600 may include receiving input to open an application menu within the application. This input may be received in any suitable manner.

At 608, the process 600 may include, in response to receiving the input to open the application menu, use the information to request dynamic content for a first interactive user experience card. In some examples, the dynamic content for the first interactive user experience card may correspond to a first JavaScript feature package that has been predefined and previously bundled.

At 610, the process 600 may include receiving input to show the first interactive user experience card. In some examples, a portion of the first interactive user experience card may be presented in connection with the application menu, but in response to the input received at 610, a complete view of the first interactive user experience card may be requested. This input may be any suitable input including, for example, a swipe input that scrolls the menu application from a first position to a second position.

At 612, the process 600 may include loading dynamic content of the first interactive user experience card, which may be requested as a feature package from a content delivery network or some other service. This may include initiating a viewing module to render the dynamic content of the first interactive user experience card in a first container. In some examples, the same viewing module is used to render additional interactive user experience cards and/or different viewing modules may be used to render the additional interactive user experience cards.

At 614, the process 600 may include determining whether there are additional interactive user experience cards. This may depend on the information requested earlier. For example, the information requested at 604 may include an identification of a number of card containers to be rendered. Thus, the determination at 614 may depend in part on the information. In some examples, the dynamic rendering application may include a parameter that may or may not be user configurable, but may otherwise control the number of interactive user experience cards presented during any one session.

If there are no other interactive user experience cards to render, the process 600 ends at 616. If there are additional interactive user experience cards, the process 600 continues to 618. At 618, the process 600 may include receiving input to view a next interactive user experience card. This input may include a swipe input that swipes from the first interactive user experience card to show the next interactive user experience card in a primary position.

At 620, the process 600 may include using the information to request dynamic content for the next interactive user experience card. The dynamic content may be requested from the content delivery network or some other service.

At 622, the process 600 may include loading dynamic content of the next interactive user experience card. This may include rendering the dynamic content in a next container associated with the next interactive user experience card based on a user input.

After 622, the process 600 may return to 614 to check for other interactive user experience cards.

Figure 7:
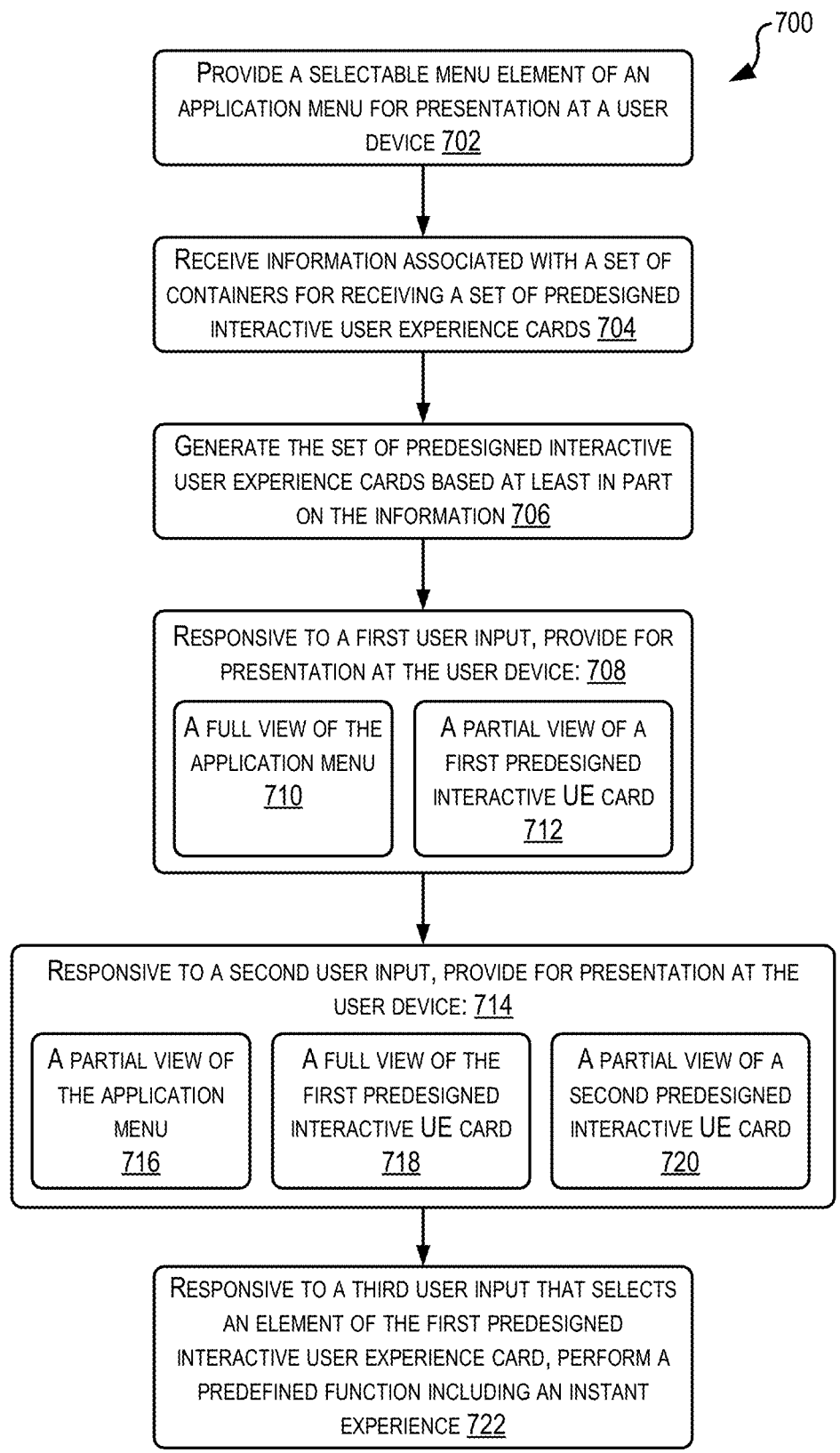
FIG. 7 is an example flow diagram depicting example acts for implementing techniques relating to dynamically rendering interactive user experience cards, according to at least one example.

FIG. 7 is flow diagram of process 700 depicting example acts for implementing techniques relating to dynamically rendering interactive user experience cards, according to at least one example. The user device 104 (FIG. 1) may perform the process 700 of FIG. 7 using the dynamic rendering component 204 (FIG. 2).

The process 700 may begin at 702 by providing a selectable menu element of an application menu for presentation at the user device. The selectable menu element may be associated with an application. In some examples, the providing may be performed while the application is open on a user device.

At 704, the process 700 may include receiving information associated with a set of containers configured to receive a set of predesigned interactive user experience cards. In some examples, the information may be requested in response to opening the application and/or accessing the application menu. In some examples, the information may include response data that includes a number of the set of containers and content location identifiers for downloading predesigned dynamic content from an external computing system.

At 706, the process 700 may include generating the set of predesigned interactive user experience cards based at least in part on the information. In this example, each predesigned interactive user experience card may include one or more links to content that is external to the application. In some examples, generating the set of predesigned interactive user experience cards is based at least in part on using the information to access an external computing system and download predesigned dynamic content from the external computing system for the set of predesigned interactive user experience cards.

At 708, the process 700 may include, responsive to a first user input, providing for presentation at the user device, at 710, a full view of the application menu which may correspond to the application, and, at 712, a partial view of a first predesigned interactive user experience card. In some examples, the first user input may select the selectable menu element. In some examples, the full view of the application menu may include presenting the application menu in a primary position and the interactive user experience card in a secondary position. In some examples, the partial view of the first predesigned interactive user experience card may include a first edge. The first predesigned interactive user experience card may be disposed in a first container corresponding to the first card.

At 714, the process 700 may include, responsive to a second user input, providing for presentation at the user device, at 716, a partial view of the application menu, at 718, a full view of the first predesigned interactive user experience card, and, at 720, a partial view of a second predesigned interactive user experience card. In some examples, the second user input may be received at the application menu or the first predesigned interactive user experience card and may function to scroll the application menu and the first predesigned interactive user experience card. The partial view of the application menu may include an edge of the application menu. The first predesigned interactive user experience card may be disposed in the first container. The partial view of the second predesigned interactive user experience card may include an edge of the second predesigned interactive user experience card disposed in a second container.

At 722, the process 700 may include, responsive to a third user input that selects an element of the first predesigned interactive user experience card, performing a predefined function that includes an instant user experience. The instant user experience may be created for the user without having to leave the arrangement of interactive user experience cards presented at 714. In some examples, the predefined function may include launching functionality of a different application of the user device without switching to the different application or navigating to a different user experience card of the application. In this example, the different user experience card may include dynamic content that is related to the first predesigned interactive user experience card.

Figure 8:
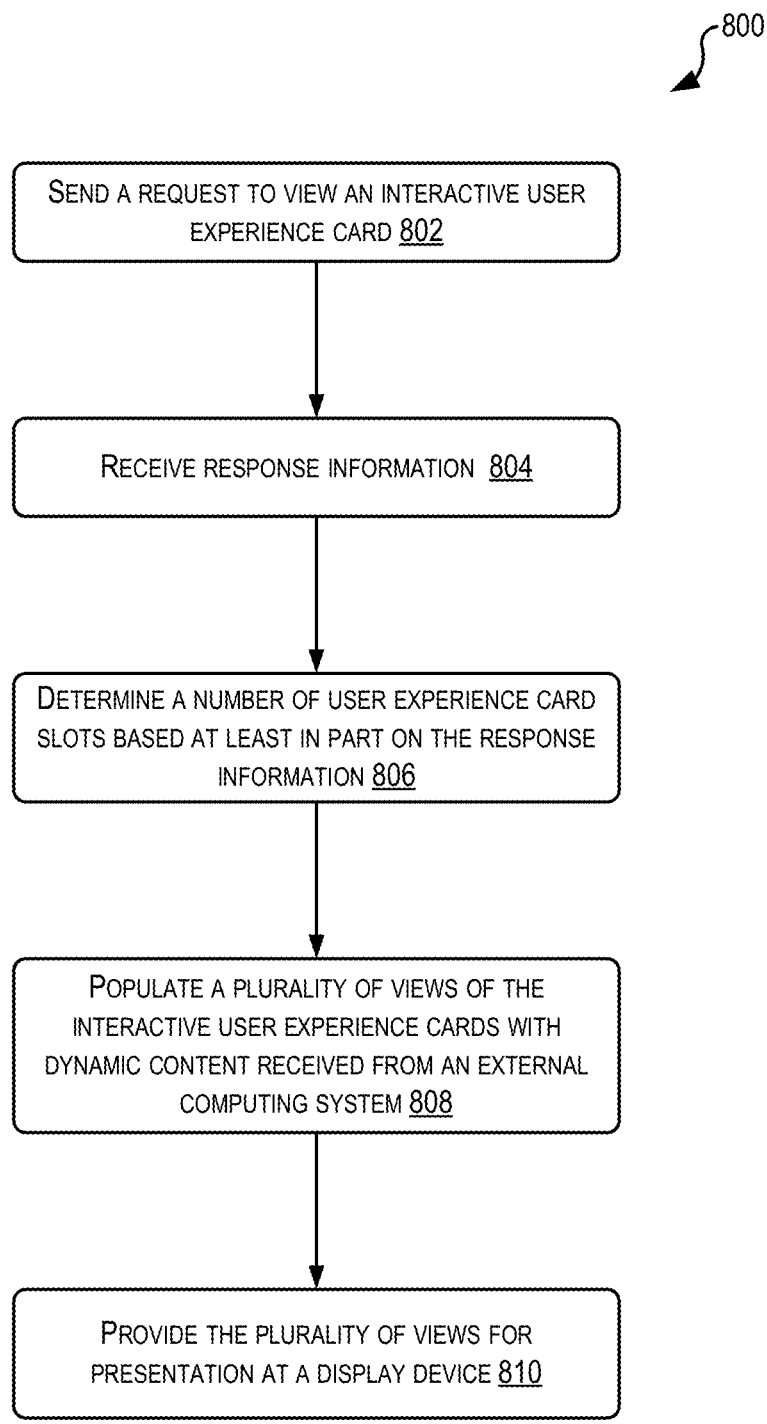
FIG. 8 is an example flow diagram depicting example acts for implementing techniques relating to dynamically rendering interactive user experience cards, according to at least one example.

FIG. 8 is flow diagram of process 800 depicting example acts for implementing techniques relating to dynamically rendering interactive user experience cards, according to at least one example. The user device 104 (FIG. 1) may perform the process 800 of FIG. 8 using the dynamic rendering component 204 (FIG. 2).

The process 800 may begin at 802 by sending a request to view an interactive user experience card at a display device of a user device. This may sent from within an application menu view of an application on the user device. In some examples, the application may include an electronic marketplace application.

At 804, the process 800 may include receiving response information, which may be in response to sending the request. Response information can include, for example, feature identifiers, number of slots, etc.

At 806, the process 800 may include determining a number of user experience card slots based at least in part on the response information. The user experience card slots may be presented at the display device of the user device.

At 808, the process 800 may include populating a plurality of interactive user experience cards with dynamic content received from an external computing system. The populating may be based at least in part on the number of user experience card slots. In some examples, populating the plurality of interactive user experience cards may include sending an additional request to the external computing system for the dynamic content and populating individual interactive user experience cards of the plurality of interactive user experience cards in response to receiving scrolling inputs that scroll between portions of the plurality of interactive user experience cards. In some examples, populating the plurality of interactive user experience cards may be based at least in part on one or more asynchronous requests to the external computing system from the user device At 810, the process 800 may include providing the plurality of interactive user experience cards for presentation at the display device.

Figure 9:
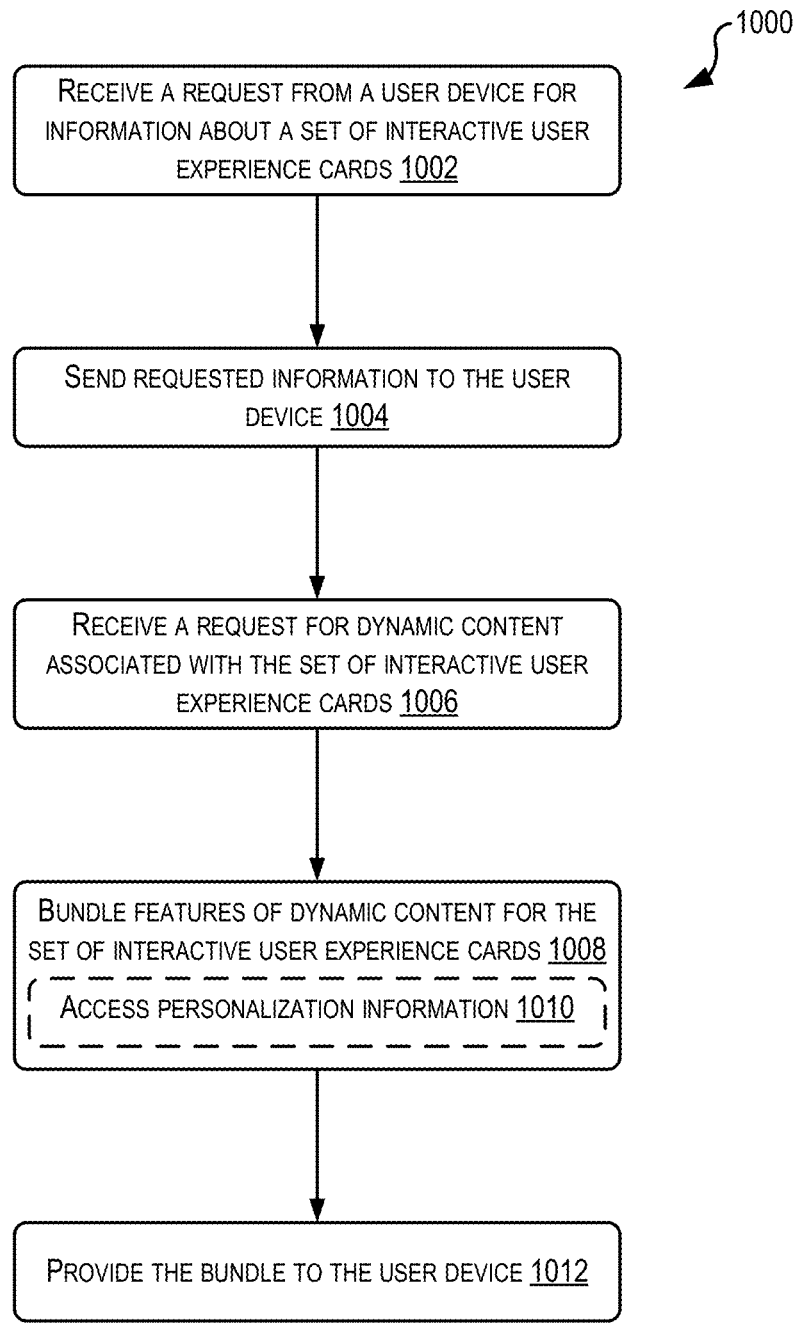
FIG. 9 is an example flow diagram depicting example acts for implementing techniques relating to dynamically rendering interactive user experience cards, according to at least one example.

FIG. 9 is flow diagram of process 900 depicting example acts for implementing techniques relating to dynamically rendering interactive user experience cards, according to at least one example. The user device 104 (FIG. 1) may perform the process 900 of FIG. 9 using the dynamic rendering component 204 (FIG. 2).

The process 900 may begin at 902 by receiving information associated with a set of user experience card slots. The set of user experience card slots may be for receiving a set of interactive user experience cards. The information may include a number of the set of user experience card slots and a set of content location identifiers that correspond to the set of interactive user experience cards and identify locations where the dynamic content of the set of interactive user experience cards is stored.

At 904, the process 900 may include generating a set of interactive user experience cards based at least in part on the information. In some examples, the set of interactive user experience cards are personalized to a user of the user device based at least in part on profile information associated with a profile of the user. The profile information may be stored by a service provider that hosts the application. A content delivery network or other external computing system that serves the dynamic content associated with the interactive user experience cards may include a module to personalize the interactive user experience cards based on the profile information accessed from the service provider. In some examples, the dynamic rendering component may include the functionality to personalize the interactive user experience cards (e.g., composition, order, etc.) by accessing user profile information that is local to the user device. In this example, the dynamic rendering component may select which interactive user experience cards to present and/or which to download by comparing the response information with the profile information.

In some examples, the set of content location identifiers identified by the information may correspond to storage locations at an external computing system. In this example, generating the set of interactive user experience cards based at least in part on the information may include using the set of content location identifiers to access the storage locations, downloading, from the storage locations, dynamic content for the set of interactive user experience cards, and generating the set of interactive user experience cards based at least in part on the downloaded dynamic content.

In some examples, receiving the information and generating the set of interactive user experience cards are performed dynamically in response to a receiving a request to access the application.

At 906, the process 900 may include providing for presentation a first portion of the set of interactive user experience cards. This first portion may be disposed in a first user experience card slot of the set of user experience card slots. In some examples, 906 may be performed at least within an application menu view of an application on a computing device.

At 908, the process 900 may include providing for presentation a second portion of the set of interactive user experience cards. This second portion may be disposed in the first user experience card slot and a second user experience card slot of the set of user experience card slots. In some examples, 908 may be performed at least within the application menu view and responsive to a first input received at the user device. The first input may include a scroll input that scrolls between the set of interactive user experience cards.

In some examples, the first portion of the set of interactive user experience cards includes a first edge view of a first interactive user experience card in the first user experience slot. In this example, the second portion of the set of interactive user experience cards may include a complete view of the first interactive user experience card in the first user experience card slot and a second edge view of a second interactive user experience card in the second user experience card slot.

At 910, the process 900 may include performing a predefined function associated with an interactive user experience card included in the second portion of the set of interactive user experience cards. In some examples, this may be performed responsive to a second input received at the user device. In some examples, the predefined function may include at least one of launching a different application within the application, downloading dynamic content to the computing device, navigating to a webpage associated with the application, initiating a stream of media content, or downloading commercial content for presentation (e.g., advertisement).

In some examples, the process 900 may further include generating an additional set of interactive user experience cards based at least in part on the information, and providing for presentation at the computing device portions of the additional set of interactive user experience cards following the second portion of the set of interactive user experience cards.

In some examples, the information is received from a first external computing system. In this example, the process 600 may further include downloading dynamic content for the set of interactive user experience cards from a second external system, and generating the set of interactive user experience cards may include generating the set of interactive user experience cards by the computing device and based at least in part on the dynamic content.

Figure 10:
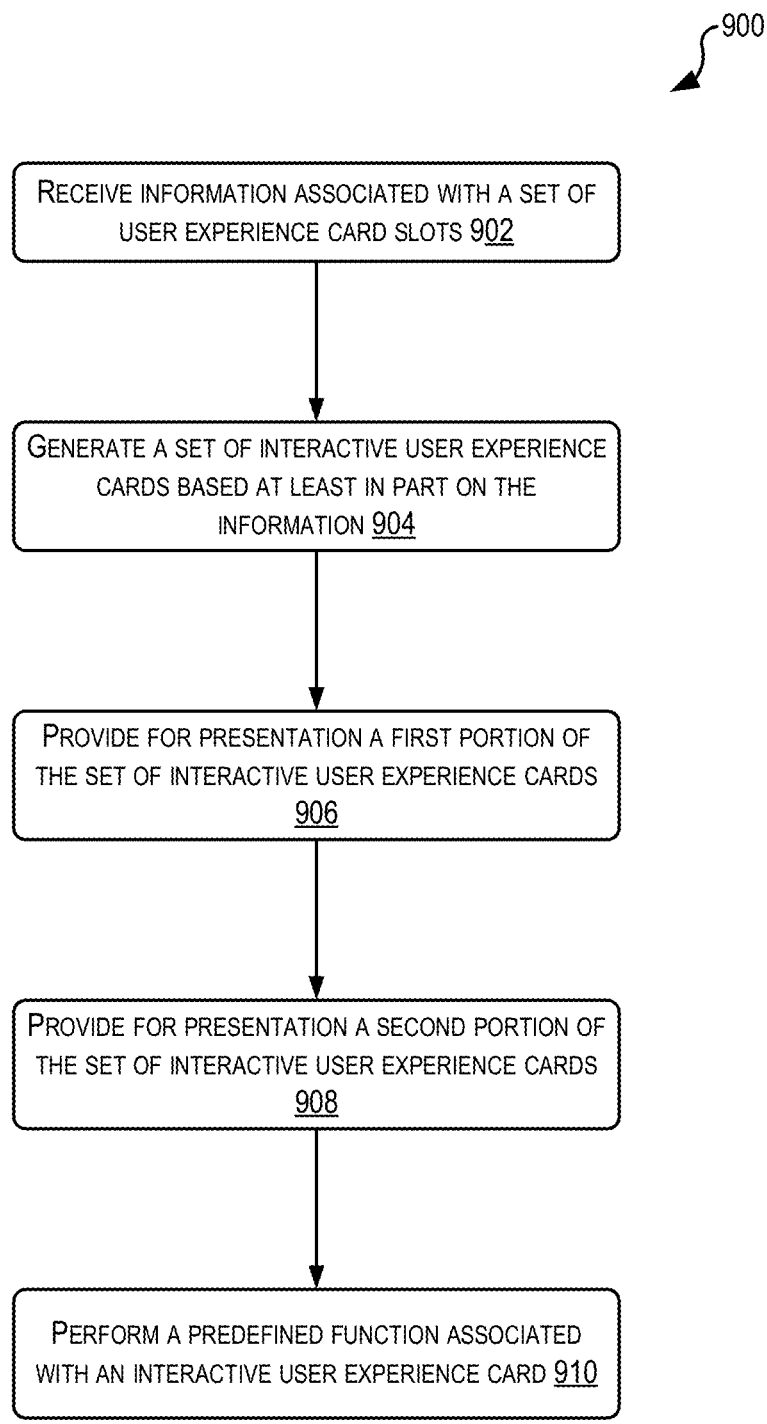
FIG. 10 is an example flow diagram depicting example acts for implementing techniques relating to dynamically rendering interactive user experience cards, according to at least one example.

FIG. 10 is flow diagram of process 1000 depicting example acts for implementing techniques relating to dynamically rendering interactive user experience cards, according to at least one example. The service provider 106 (FIG. 1) and/or the CDN 202 (FIG. 2) may perform the process 1000 of FIG. 10 using the dynamic rendering component 204 (FIG. 2).

The process 1000 may begin at 1002 by receiving a request from a user device for information about a set of interactive user experience cards. The request may identify the user device and/or a user of the user device.

At 1004, the process 1000 may include sending the requested information to the user device. The requested information may identify a number of card slots for the interactive user experience cards, locations where dynamic content (e.g., feature packages) can be downloaded, and other information about the interactive user experience cards.

At 1006, the process 1000 may include receiving a request for dynamic content associated with the set of interactive user experience cards. In some examples, a single request is received for all dynamic content, or individual requests may be received for individual parts of the complete set of dynamic content.

At 1008, the process 1000 may include bundling features (e.g., dynamic content) for the set of interactive user experience cards. This may include creating particular feature bundles that can be executed at the user device to present the set of interactive user experience cards.

At 1010, the process 1000 may include providing the bundle to the user device.

Figure 11:
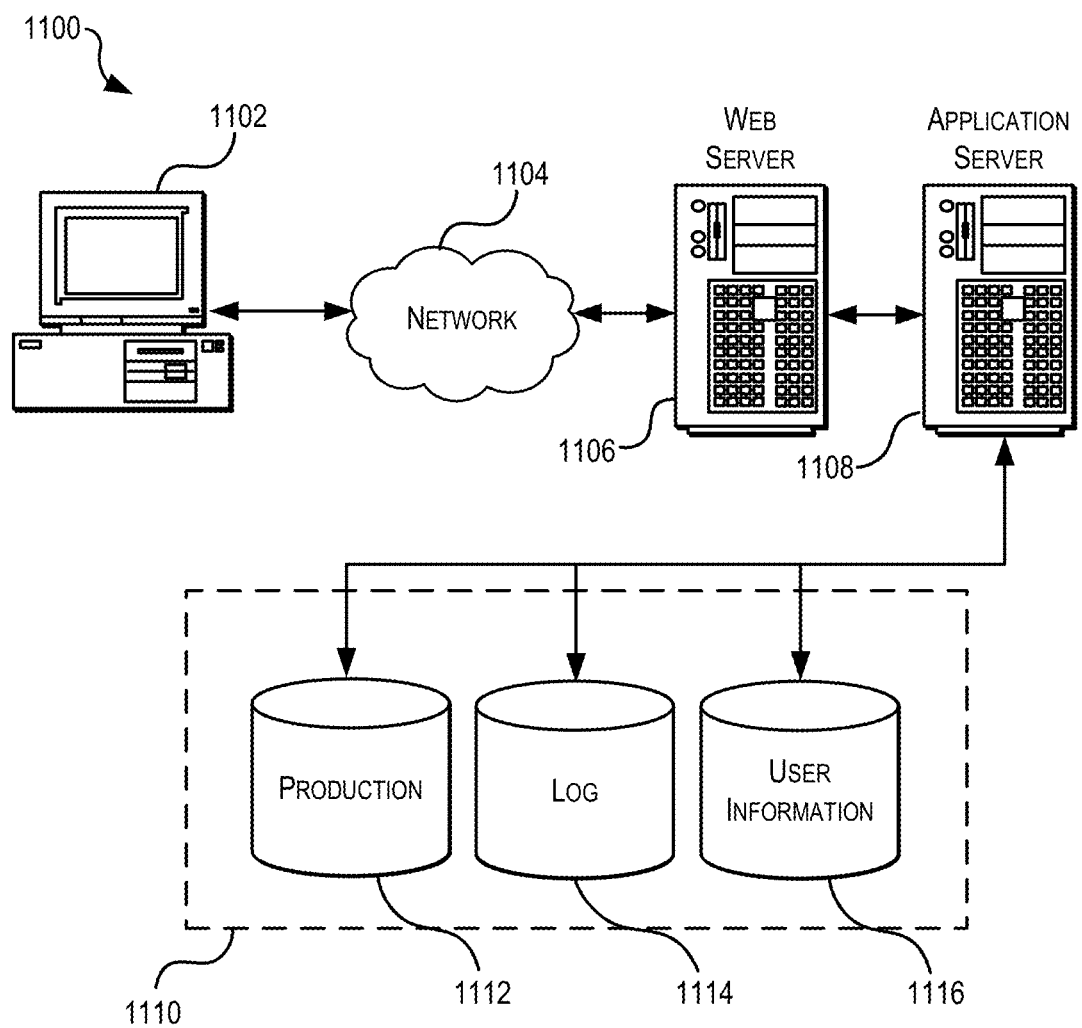
FIG. 11 is an example schematic architecture for implementing techniques relating to dynamically rendering interactive user experience cards, according to at least one example.

FIG. 11 illustrates aspects of an example environment 1100 for implementing aspects in accordance with various examples. As will be appreciated, although a Web-based environment is used for purposes of explanation, different environments may be used, as appropriate, to implement various examples. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    while an application is open on a user device, providing a selectable menu element of the application for presentation at the user device, the selectable menu element being associated with an application menu;
    receiving information corresponding to a set of containers configured to receive a set of predesigned interactive user experience cards;
    generating the set of predesigned interactive user experience cards based at least in part on the information, each predesigned interactive user experience card comprising one or more links to launch instant experiences, each predesigned interactive user experience card having a graphical perimeter that defines a fixed rectangular shape;
    responsive to a first user input that selects the selectable menu element, providing for concurrent presentation at the user device:
        a sub-menu disposed in an upper region of a display of the user device, the sub-menu comprising a user interface element associated with the selectable menu element of the application; and
        a portion of a first graphical perimeter of a first predesigned interactive user experience card of the set of predesigned interactive user experience cards disposed in a first container of the set of containers, the first container disposed in a lower region of the display of the user device, the portion of the first graphical perimeter comprising less than a whole of the first graphical perimeter;
    responsive to a second user input that scrolls the application menu and the first predesigned interactive user experience card, providing for concurrent presentation at the user device:
        the sub-menu disposed in the upper region;
        a portion of the application menu in the lower region of the display of the user device;
        the whole of the first graphical perimeter of the first predesigned interactive user experience card disposed in the first container and in the lower region; and
        a portion of a second graphical perimeter of a second predesigned interactive user experience card of the set of predesigned interactive user experience cards disposed in a second container of the set of containers and in the lower region, the portion of the second graphical perimeter comprising less than a whole of the second graphical perimeter; and
    responsive to a third user input that selects an element of the first predesigned interactive user experience card, performing a predefined function that comprises an instant experience.

2. The computer-implemented method of claim 1, wherein generating the set of predesigned interactive user experience cards is based at least in part on using the information to access an external computing system and download predesigned dynamic content from the external computing system for the set of predesigned interactive user experience cards.

3. The computer-implemented method of claim 2, wherein the information associated with the set of containers comprises response data that includes a number of the set of containers and content location identifiers for downloading the predesigned dynamic content from the external computing system.

4. The computer-implemented method of claim 1, wherein the predefined function comprises launching functionality of a different application without switching to the different application.

5. The computer-implemented method of claim 1, wherein the predefined function comprises navigating to a different page of the application, the different page comprising content that is related to the first predesigned interactive user experience card.

6. A computer-implemented method, comprising:
    receiving information corresponding to a set of user experience card slots for receiving a set of interactive user experience cards;
    generating the set of interactive user experience cards based at least in part on the information, each interactive user experience card having a graphical perimeter that defines a fixed rectangular shape;
    within an application menu view of an application on a computing device,
        providing for concurrent presentation at the computing device:
            a sub-menu disposed in an upper region of a display of the computing device, the sub-menu comprising a user interface element associated with a menu function; and
            a first portion of the set of interactive user experience cards disposed in the set of user experience card slots, the set of user experience card slots disposed in a lower region of the display of the computing device, the first portion of the set of interactive user experience cards comprising:
  a whole of a first graphical perimeter of a first interactive user experience card comprising the application menu view of the application disposed in a first user experience card slot of the set of user experience card slots, and
  less than a whole of a second graphical perimeter of a second interactive user experience card in a second user experience card slot of the set of user experience card slots; and
responsive to a first input received at the computing device, providing for presentation at the computing device the sub-menu and a second portion of the set of interactive user experience cards, the second portion of the set of interactive user experience cards disposed in the set of user experience card slots, the second portion of the set of interactive user experience cards comprising:
  the whole of the second graphical perimeter of the second interactive user experience card;
  less than a whole of a third graphical perimeter of a third interactive user experience card; and
  less than a whole of the first graphical perimeter of the first interactive user experience card in a third user experience card slot; and
responsive to a second input received at the computing device, performing a predefined function associated with the second interactive user experience card included in the second portion of the set of interactive user experience cards.

7. The computer-implemented method of claim 6, wherein the information comprises a number of the set of user experience card slots and a set of content location identifiers that correspond to the set of interactive user experience cards.

8. The computer-implemented method of claim 7, wherein:
  the set of content location identifiers correspond to storage locations at an external computing system; and
  generating the set of interactive user experience cards based at least in part on the information comprises:
    using the set of content location identifiers to access the storage locations;
    downloading, from the storage locations, dynamic content for the set of interactive user experience cards; and
    generating the set of interactive user experience cards based at least in part on the downloaded dynamic content.

9. The computer-implemented method of claim 6, wherein receiving the information and generating the set of interactive user experience cards are performed dynamically in response to a receiving a request to access the application.

10. The computer-implemented method of claim 6, further comprising:
  generating an additional set of interactive user experience cards based at least in part on the information; and
  providing for presentation, at the computing device, portions of the additional set of interactive user experience cards following the presentation of the second portion of the set of interactive user experience cards.

11. The computer-implemented method of claim 6, wherein the predefined function comprises at least one of launching a different application within the application, downloading content to the computing device, navigating to a page associated with the application, initiating a stream of media content, or downloading commercial content for presentation.

12. The computer-implemented method of claim 6, wherein:
  the method further comprises downloading dynamic content for the set of interactive user experience cards from a second external system; and
  generating the set of interactive user experience cards comprises generating the set of interactive user experience cards by the computing device and based at least in part on the downloaded dynamic content.

13. A system, comprising:
  a memory configured to store computer-executable instructions; and
  a processor configured to access the memory and execute the computer-executable instructions to at least:
    responsive to a first request from a user device, send, to the user device, information corresponding to a set of containers, the set of containers configured to receive a set of user experience cards, the information identifying a number of the set of containers and location identifiers of predesigned dynamic content for populating the set of user experience cards; and
    responsive to a second request from the user device, send, to the user device, the predesigned dynamic content, the second request comprising the location identifiers, wherein the information and the predesigned dynamic content configures the user device to:
      populate the set of user experience cards with the predesigned dynamic content, each user experience card having a graphical perimeter that defines a fixed rectangular shape;
      present a sub-menu disposed in an upper region of a display of the user device, the sub-menu comprising a user interface element associated with a selectable menu element of an application menu view of an application of the user device;
      present a first portion of the set of user experience cards in a lower region of the display of the user device, the first portion comprising less than a first whole of a first graphical perimeter of a first interactive user experience card of the set of user experience cards; and
      present a second portion of the set of user experience cards in the lower region of the display of the user device, the second portion comprising:
        the first whole of the first graphical perimeter of the first interactive user experience card; and
        less than a second whole of a second graphical perimeter of a second user experience card of the set of user experience cards.

14. The system of claim 13, wherein the application is an electronic marketplace application, and wherein the first request is generated responsive to launching of the electronic marketplace application on the user device.

15. The system of claim 13, wherein populating the set of user experience cards comprises:
  receiving, from the user device, an additional request for additional predesigned dynamic content; and
  sending the additional predesigned dynamic content to the user device, the additional predesigned dynamic content configuring the user device to populate individual user experience cards of the set of user experience cards in response to receiving scrolling inputs that scroll between portions of the set of user experience cards.

16. The system of claim 13, wherein populating the set of user experience cards is based at least in part the system responding to on one or more asynchronous requests from the user device.

17. The computer-implemented method of claim 1, wherein the application menu comprises an application graphical perimeter that defines an application fixed rectangular shape, the application fixed rectangular shape equal to the fixed rectangular shape of the set of predesigned interactive user experience cards.

18. The computer-implemented method of claim 6, wherein the menu function comprises a frequently accessed menu function, determined at least in part based on historical use information.

19. The computer-implemented method of claim 6, further comprising, within the application menu view of the application on the computing device, providing for presentation at the computing device a commonly used list comprising a link to a feature of an application of the computing device, wherein items on the commonly used list are personalized to a user of the computing device based at least in part on user interaction data indicating features commonly accessed by the user of the computing device.

20. The computer-implement method of claim 6, wherein providing for presentation at the computing device the second portion of the set of interactive user experience cards further comprises:
  responsive to the first input received at the computing device, providing for presentation at the computing device in the upper region of the display a menu user interface element, the menu user interface element configured to partially overlay the first user experience card slot and the third user experience card slot with the application menu view of the application.

\* \* \* \* \*